US010540934B2

(12) United States Patent
Choi et al.

(10) Patent No.: US 10,540,934 B2
(45) Date of Patent: Jan. 21, 2020

(54) LIQUID CRYSTAL DISPLAY DEVICE AND DRIVING METHOD THEREOF

(71) Applicant: SAMSUNG ELECTRONICS CO., LTD., Suwon-si (KR)

(72) Inventors: Doo-seop Choi, Anyang-si (KR); Gi-yeong Gim, Yongin-si (KR); Young-su Moon, Seoul (KR); Young-hoon Jeong, Suwon si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/761,715

(22) PCT Filed: Nov. 16, 2015

(86) PCT No.: PCT/KR2015/012282
§ 371 (c)(1),
(2) Date: Mar. 20, 2018

(87) PCT Pub. No.: WO2017/086493
PCT Pub. Date: May 26, 2017

(65) Prior Publication Data
US 2018/0366074 A1 Dec. 20, 2018

(51) Int. Cl.
G09G 3/36 (2006.01)
G02F 1/133 (2006.01)
G02F 1/1335 (2006.01)

(52) U.S. Cl.
CPC ....... G09G 3/3607 (2013.01); G02F 1/13306 (2013.01); G02F 1/133602 (2013.01);
(Continued)

(58) Field of Classification Search
CPC ......... G09G 3/3607; G09G 2320/0626; G09G 2310/0264; G02F 1/13306; G02F 1/133602
See application file for complete search history.

(56) References Cited

U.S. PATENT DOCUMENTS 7,154,468 B2 12/2006 Linzmeier et al.
8,159,449 B2 4/2012 Kimura et al.
(Continued)

FOREIGN PATENT DOCUMENTS

EP 1446791 B1 9/2015
JP 2010113099 A 5/2010
(Continued)

OTHER PUBLICATIONS

Communication dated Jun. 27, 2018, issued by the European Patent Office in counterpart European Patent Application No. 15908839.2.
(Continued)

Primary Examiner — Abbas I Abdulselam
(74) Attorney, Agent, or Firm — Sughrue Mion, PLLC

(57) ABSTRACT

Disclosed is a local dimming liquid crystal display device. The present local dimming liquid crystal display device comprises a display panel unit having a plurality of pixels; a panel driving unit for driving each of the plurality of pixels; a backlight unit comprising a plurality of backlights for dividing the display panel unit into a plurality of areas to emit light to each of the plurality of regions; a backlight driving unit for driving the plurality of backlights on the basis of gray level information of the plurality of pixels corresponding to each of the plurality of areas; and a processor for calculating a first amount of light to be incident on each pixel on the basis of the gray level of each pixel, calculating a second amount of light incident on each pixel in accordance with a driving state of the plurality of backlights, changing the gray level of at least one of the plurality of pixels on the basis of the difference between the first amount of light and the second amount of light, and controlling the panel driving unit on the basis of the changed gray level.

20 Claims, 15 Drawing Sheets

(52) U.S. Cl.
CPC ............ *G09G 2310/0264* (2013.01); *G09G 2320/0626* (2013.01)

(56) References Cited

U.S. PATENT DOCUMENTS

| | | | |
|---|---|---|---|
| 8,947,465 B2 | 2/2015 | Kerofsky | |
| 2006/0007249 A1* | 1/2006 | Reddy | G06F 3/03542 345/690 |
| 2006/0044254 A1 | 3/2006 | Kirk | |
| 2010/0156961 A1* | 6/2010 | Kim | G09G 3/3611 345/690 |
| 2013/0249973 A1* | 9/2013 | Honbo | G09G 3/342 345/691 |
| 2014/0139568 A1* | 5/2014 | Yoshida | G09G 3/20 345/691 |

FOREIGN PATENT DOCUMENTS

| | | |
|---|---|---|
| JP | 2011128625 A | 6/2011 |
| JP | 2012118419 A | 6/2012 |
| JP | 2015018264 A | 1/2015 |
| KR | 1020070058572 A | 6/2007 |
| KR | 1020070068581 A | 7/2007 |
| KR | 101158588 B1 | 6/2012 |
| WO | 2012/090358 A1 | 7/2012 |

OTHER PUBLICATIONS

International Search Report, issued by International Searching Authority in corresponding International Application No. PCT/KR2015/012282, dated Sep. 7, 2016.

Written Opinion issued by the International Bureau in corresponding International Application No. PCT/KR2015/012282, dated Sep. 7, 2016.

* cited by examiner

FIG. 8A

GRAY LEVEL

| 0 | 1 | 2 | ... | k | k+1 | k+2 | ... | L-3 | L-2 | L-1 |

$\lambda_0$  $\lambda_1$  $\lambda_2$  $\lambda_k$  $\lambda_{k+1}$  $\lambda_{k+2}$  $\lambda_{L-3}$  $\lambda_{L-2}$  $\lambda_{L-1}$

FIG. 8B

GRAY LEVEL

| 0 | 1 | 2 | ⋯ | k | k+1 | k+2 | ⋯ | L-3 | L-2 | L-1 |

$\underbrace{\phantom{000}}_{\lambda_0}$  $\underbrace{\phantom{00000}}_{\lambda_{k/3}}$  $\underbrace{\phantom{00000}}_{\lambda_{L/3-1}}$

LIQUID CRYSTAL DISPLAY DEVICE AND DRIVING METHOD THEREOF

TECHNICAL FIELD

The present disclosure relates to a liquid crystal display device and a driving method thereof, and more particularly, to a liquid crystal display device provided with local dimming technology, and a driving method thereof.

BACKGROUND ART

Thanks to the development of electronic technology, display technology for displaying information is rapidly developing. Due to the rapid development of display technology, there is an increasing demand for flat panel displays such as liquid crystal displays (LCDs).

The LCD may adjust an amount of transmitted light of light emitted from a backlight by adjusting transmittance of liquid crystals according to a voltage applied to a panel. The backlight is normally implemented by using a light emitting diode (LED), and is eco-friendly and has a response speed of a few nano seconds, and thus has the advantages of a high-speed response and a long lifespan.

In addition, when local dimming technology is applied to the backlight, a contrast ratio can be enhanced and power efficiency can be enhanced by individually controlling a plurality of backlights.

However, a plurality of pixels correspond to one backlight, and thus there is a problem that some pixels are not represented darkly due to neighboring bright pixels although they should be represented darkly.

DETAILED DESCRIPTION OF THE PRESENT DISCLOSURE

Technical Objects

The present disclosure has been developed in order to meet the above-mentioned demand, and an object of the present disclosure is to provide an LCD device which calibrates a gray level of a pixel due to a gray level difference among adjacent pixels, and a driving method thereof.

Technical Solving Method

According to an embodiment of the present disclosure to achieve the above-described object, a local dimming LCD device includes: a display panel comprising a plurality of pixels; a panel driver configured to drive each of the plurality of pixels; a backlight unit comprising a plurality of backlights to divide the display panel into a plurality of regions, and to emit light to each of the plurality of regions; a backlight driver configured to drive the plurality of backlights based on gray level information of the plurality of pixels corresponding to the plurality of regions; and a processor configured to calculate a first amount of light to be incident on each pixel based on the gray level of each pixel, to calculate a second amount of light incident on each pixel according to a driving state of the plurality of backlights, to change a gray level of at least one of the plurality of pixels based on a difference between the first amount of light and the second amount of light, and to control the panel driver based on the changed gray level.

In addition, the processor may be configured to change the gray level of each pixel based on the difference between the first amount of light and the second amount of light.

In addition, the processor may be configured to change the gray level of each pixel based on the difference between the first amount of light and the second amount of light, and the gray level of each pixel.

In addition, the processor may be configured to reduce a gray level of a pixel the gray level of which is less than or equal to a predetermined value from among pixels in which the difference between the first amount of light and the second amount of light is greater than or equal to a predetermined threshold value.

In addition, the processor may be configured to calculate the changed gray level through the following equation:

$$I'(x,y)=I(x,y)-\Delta$$

where $I'(x,y)$ is a changed gray level of a pixel located at coordinates $(x,y)$, $I(x,y)$ is an original gray level of the pixel located at coordinates $(x,y)$, and $\Delta$ is an amount of gray level adjustment determined based on the difference between the first amount of light and the second amount of light, and the gray level of each pixel.

In addition, the processor may be configured to calculate the amount of gray level adjustment through the following equation:

$$\Delta=\lambda(B(x,y))\times(I(x,y)-\delta(I(x,y)))$$

where $B(x,y)$ is the second amount of light at the pixel located at coordinates $(x,y)$, $\lambda(B(x,y))$ is a predetermined function regarding $B(x,y)$, and $\delta(I(x,y))$ is a predetermined function regarding $I(x,y)$.

In addition, the $\lambda$ function may be set to a different value in every light amount section when a range of an amount of light to be incident on each pixel by the backlight is divided into a predetermined number of light amount sections.

In addition, the processor may be configured to group the plurality of pixels to include a predetermined number of adjacent pixels, and to calculate $\Delta$ for each region including the grouped pixels.

In addition, the processor may be configured to control the backlight driver to drive the plurality of backlights based on any one of a highest value of the gray levels of the plurality of pixels corresponding to the plurality of regions, and an average value of the gray levels of the plurality of pixels.

According to an embodiment of the present disclosure, a driving method of a local dimming LCD device including a plurality of backlights to emit light to a plurality of regions includes: driving the plurality of backlights based on gray level information of a plurality of pixels corresponding to the plurality of regions; calculating a first amount of light to be incident on each pixel based on the gray level of each pixel; calculating a second amount of light incident on each pixel according to a driving state of the plurality of backlights; changing a gray level of at least one of the plurality of pixels based on a difference between the first amount of light and the second amount of light; and representing the plurality of pixels based on the changed gray level.

In addition, the changing may include changing the gray level of each pixel based on the difference between the first amount of light and the second amount of light.

In addition, the changing may include changing the gray level of each pixel based on the difference between the first amount of light and the second amount of light, and the gray level of each pixel.

In addition, the changing may include reducing a gray level of a pixel the gray level of which is less than or equal to a predetermined value from among pixels in which the difference between the first amount of light and the second amount of light is greater than or equal to a predetermined threshold value.

In addition, the changing may include changing the gray level of each pixel through the following equation:

$$I'(x,y)=I(x,y)-\Delta$$

where I'(x,y) is a changed gray level of a pixel located at coordinates (x,y), I(x,y) is an original gray level of the pixel located at coordinates (x,y), and Δ is an amount of gray level adjustment determined based on the difference between the first amount of light and the second amount of light, and the gray level of each pixel.

In addition, the changing may include changing the gray level of each pixel through the following equation:

$$\Delta=\lambda(B(x,y))\times(I(x,y)-\delta(I(x,y)))$$

where B(x,y) is the second amount of light at the pixel located at coordinates (x,y), λ(B(x,y)) is a predetermined function regarding B(x,y), and δ(I(x,y)) is a predetermined function regarding I(x,y).

In addition, the λ function may be set to a different value in every light amount section when a range of an amount of light to be incident on each pixel by the backlight is divided into a predetermined number of light amount sections.

In addition, the changing may include grouping the plurality of pixels to include a predetermined number of adjacent pixels, and calculating Δ for each region including the grouped pixels.

In addition, the driving may include driving the plurality of backlights based on any one of a highest value of the gray levels of the plurality of pixels corresponding to the plurality of regions, and an average value of the gray levels of the plurality of pixels.

Advantageous Effect

According to various embodiments of the present disclosure as described above, even when there is a great gray level difference among adjacent pixels, the LCD device may represent a pixel having a low gray level darkly

BRIEF DESCRIPTION OF THE DRAWINGS

FIGS. 8A and 8B are views to illustrate an example of a method for reducing an amount of operation;

BEST MODE FOR EMBODYING THE INVENTION

Figure 1:
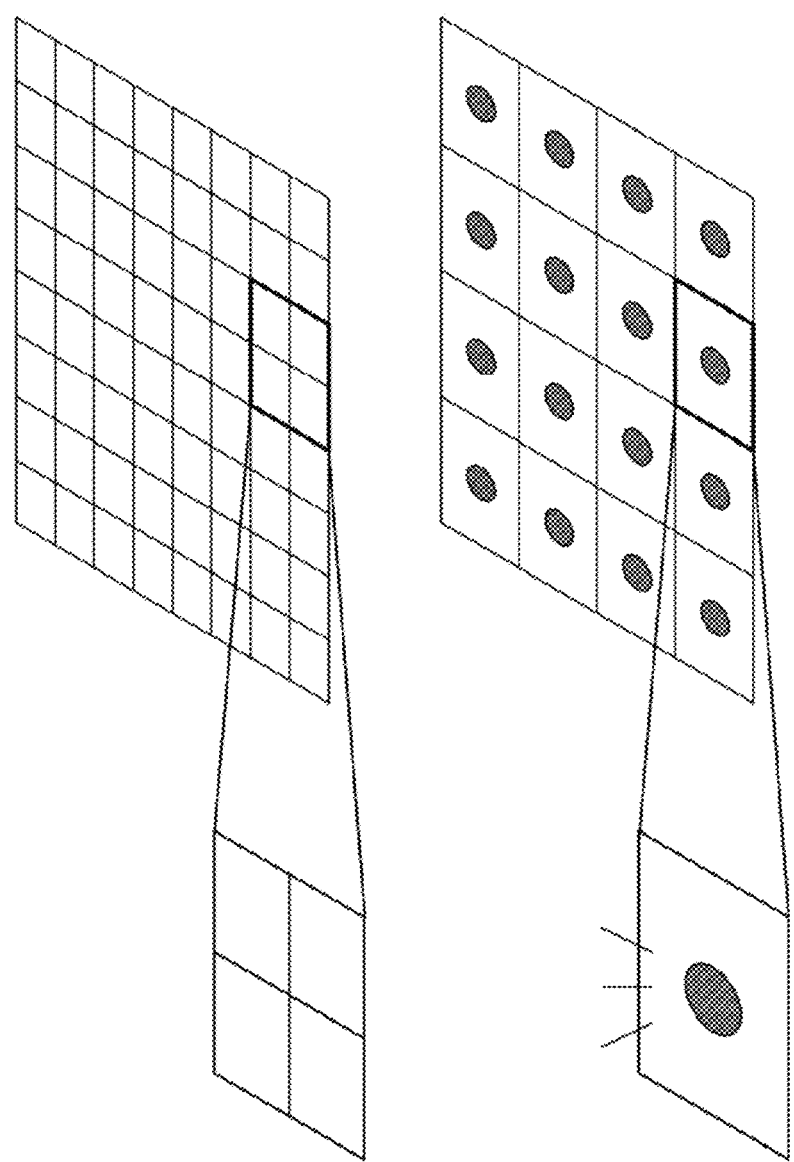
FIG. 1 is a view to illustrate an LCD device provided with local dimming technology for easy understanding of the present disclosure.

Various embodiments of the present disclosure will be described herein below with reference to the accompanying drawings. However, various embodiments of the present disclosure are not limited to the specific embodiments and should be construed as including modifications, equivalents and/or alternatives of exemplary embodiments of the present disclosure. In the explanation of the drawings, same or similar reference numerals are used for similar elements.

The term such as "first" and "second" used in the present disclosure may be used to distinguish various elements regardless of an order and/or importance of the elements. Accordingly, the order or importance of the corresponding elements are not limited by these expressions. For example, a first element may be named a second element without departing from the scope of right of the present disclosure, and similarly, a second element may be named a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The terms used in the present disclosure are just for the purpose of describing particular embodiments and are not intended to limit the scope of other embodiments. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments. According to circumstances, even the terms defined in the exemplary embodiments should not be interpreted as excluding the embodiments of the present disclosure.

Hereinafter, various embodiments of the present disclosure will be described in detail with reference to the accompanying drawings.

FIG. 1 is a view to illustrate an LCD device provided with local dimming technology for easy understanding of the present disclosure.

The LCD device may include a display panel and a backlight. The display panel may include a liquid crystal layer, a polarization filter, a color filter, a transistor, etc. However, only the liquid crystal layer is illustrated on the left of FIG. 1 for convenience of explanation.

The liquid crystal layer may include a plurality of liquid crystals. The liquid crystal is a substance that has an electric property in an intermediate state between liquid and solid.

The liquid crystal has an arrangement of liquid crystal elements formed by an electric field in a predetermined direction, and allows light having a wave of a predetermined direction to selectively pass therethrough. That is, the liquid crystals are linearly arranged by an electric field due to a molecular structure characteristic, and enables rotation in the unit of 90 degrees between layers due to a mechanical characteristic. Such a 90-degree unit rotation arrangement may be referred to as twisted nematic (TN), and a 270-degree unit rotation arrangement may be referred to as super twisted nematic (STN). When an electric field is applied to the liquid crystals of such a bar shape with two layers disposed therebetween, locations of the liquid crystals are changed according to the direction of the electric field and an amount of light passing through the liquid crystals is changed. That is, the liquid crystal layer may adjust a gray level for each pixel by adjusting light transmissivity of each liquid crystal.

Grayscale is a range of shades of gray between white and black, and indicates a scale of a brightness difference, and the gray level indicates each level in the grayscale. For example, the gray level may be represented in the range from 0 to 255, and in general, a low gray level is dark and a high gray level is bright.

The backlight may be implemented by using a cold cathode fluorescent lamp (CCLF), a light emitting diode (LED), etc., and local dimming technology which will be described below may be implemented by using an LED backlight, and thus, hereinafter, the LED backlight will be described.

The backlight may be classified into an edge type backlight and a direct type backlight according to an arrangement of a plurality of LEDs. Although FIG. 1 illustrates the direct type backlight, the present disclosure is applicable to the other types of backlight having different arrangements such as the edge type backlight.

Local dimming, which is a kind of method for driving the backlight, refers to screen split driving. Specifically, local dimming refers to technology that divides the backlight into a plurality of regions, and turns off the backlight or reduces light in a dark region in which the gray level is low, and increases light of the backlight in a bright region, based on the gray level of each pixel. That is, local dimming is technology that greatly enhances a contrast ratio and power consumption by individually driving the plurality of LEDs.

When local dimming technology is used, a specific LED may reduce light. In this case, in order to compensate for a problem that a pixel corresponding to the specific LED is represented as dark as the reduced light, local dimming technology increases the gray level of the pixel corresponding to the specific LED.

When local dimming technology is used, the contrast ratio is enhanced. To explain this, a case in which local dimming technology is not applied will be described first.

When local dimming technology is not used, luminance of a pixel located at coordinates (x,y) may be expressed as follows:

$$L(x, y) = B\max \times (I(x, y) + \sigma) \quad \text{[Equation 1]}$$
$$= B\max \times I(x, y) + B\max \times \sigma$$

where $L(x,y)$ is luminance of a pixel located at coordinates $(x,y)$, $B\max$ is maximum luminance of the backlight, $I(x,y)$ is a gray level of the pixel located at coordinates $(x,y)$, and $\sigma$ is a leakage ratio due to a physical limit of a liquid crystal.

The leakage ratio occurs due to a characteristic that all light is not blocked due to the physical limit of the liquid crystal. For example, when the gray level is 0, the liquid crystal should completely block light of the LED and the luminance of a pixel should be 0. However, in reality, the luminance of the pixel is $B\max \times \sigma$ due to the leakage ratio. That is, even when the gray level is not 0, the luminance of the pixel becomes brighter as much as $B\max \times \sigma$, and accordingly, the contrast ratio of the LCD device is reduced.

This phenomenon is a kind of leakage phenomenon. The leakage phenomenon refers to a phenomenon in which a pixel is represented brighter than its gray level. There are various examples of the leakage phenomenon in addition to the above-described case of the leakage ratio. The leakage phenomenon may be caused by a hardware-wise defect such as separation of an adhesion surface or may be caused due to a problem in driving such as local dimming. This will be described below.

When local dimming technology is not used, luminance of a pixel located at coordinates (x,y) may be expressed as follows:

$$L(x, y) = (B\max \times Rb(x, y)) \times (I(x, y) \times Rc(x, y) + \sigma) \quad \text{[Equation 2]}$$
$$= B\max \times I(x, y) + (B\max \times Rb(x, y)) \times \sigma (\text{if, } Rb = 1/Rc)$$

where $L(x,y)$ is luminance of a pixel located at coordinates $(x,y)$, $B\max$ is maximum luminance of the backlight, $I(x,y)$ is a gray level of the pixel located at coordinates $(x,y)$, $\sigma$ is a leakage ratio due to a physical limit of a liquid crystal, $Rb(x,y)$ is a backlight dimming ratio of the pixel located at coordinates $(x,y)$ and has a value ranging from 0 to 1, and $Rc(x,y)$ is a compensation ratio of the pixel located at coordinates $(x,y)$ and has a value greater than 1.

It is common that Rb and Rc have an inverse relationship, and in this case, the second equal sign in Equation 2 may be established.

When local dimming technology is applied, the luminance of the pixel becomes brighter as much as $(B\max \times Rb(x,y)) \times \sigma$. When local dimming technology is applied, the maximum luminance of the backlight is reduced by the ratio of $Rb(x,y)$, and thus the leakage is reduced and the contrast ratio is enhanced, in comparison with the case where local dimming technology is not applied.

That is, as $Rb(x,y)$ is reduced, the leakage is reduced. However, if $Rb(x,y)$ is reduced, $Rc(x,y)$ increases and $I(x,y) \times Rc(x,y)$ increases, and thus the luminance of the pixel may exceed the gray level that the pixel can represent. This phenomenon is referred to as "saturation," and $Rb(x,y)$ may be determined in consideration of saturation.

Comparing the size of the pixel and the size of the backlight, the total number of pixels and the total number of backlights may be different. In general, the total number of pixels may be larger than the total number of backlights. For example, FIG. 1 illustrates enlarged views of the display panel and a portion of the backlight on the lower end. In FIG. 1, four pixels correspond to one backlight. This is for convenience of explanation, and a corresponding ratio between the number of pixels and the number of backlights may vary according to the type of the LCD device.

For convenience of explanation, the case where four pixels correspond to one backlight will be described. When three of four pixels have high gray levels and one pixel has a low gray level, the backlight emits bright light in consideration of the three pixels having high gray levels.

The LCD device may determine an intensity of light to be emitted by using a maximum value and an average value of gray levels of the plurality of pixels corresponding to a specific backlight. However, this should not be considered as limiting, and the LCD device may determine an intensity of light to be emitted by using any other values.

However, it is common that the LCD device determines an intensity of light to be emitted from a specific backlight with reference to a pixel of the plurality of pixels corresponding the specific backlight that has a high gray level.

When the intensity of light to be emitted from the backlight is set to be strong in consideration of the pixels having the high gray levels rather than one pixel having the low gray level as described above, one pixel having the low gray level may be represented brighter than its gray level value. That is, the leakage phenomenon occurs. Accordingly, a pixel having a great gray level difference should be detected and the gray level of the pixel having the low gray level should be further reduced.

Figure 2A:
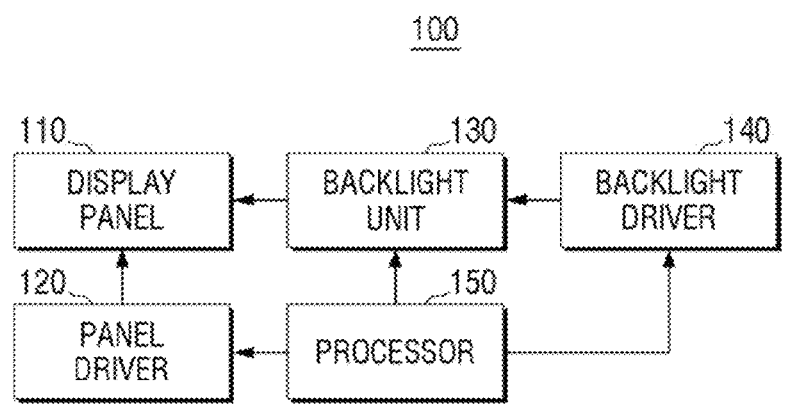
FIGS. 2A and 2B are views illustrating a configuration of an LCD device according to an embodiment of the present disclosure.
Figure 2B:
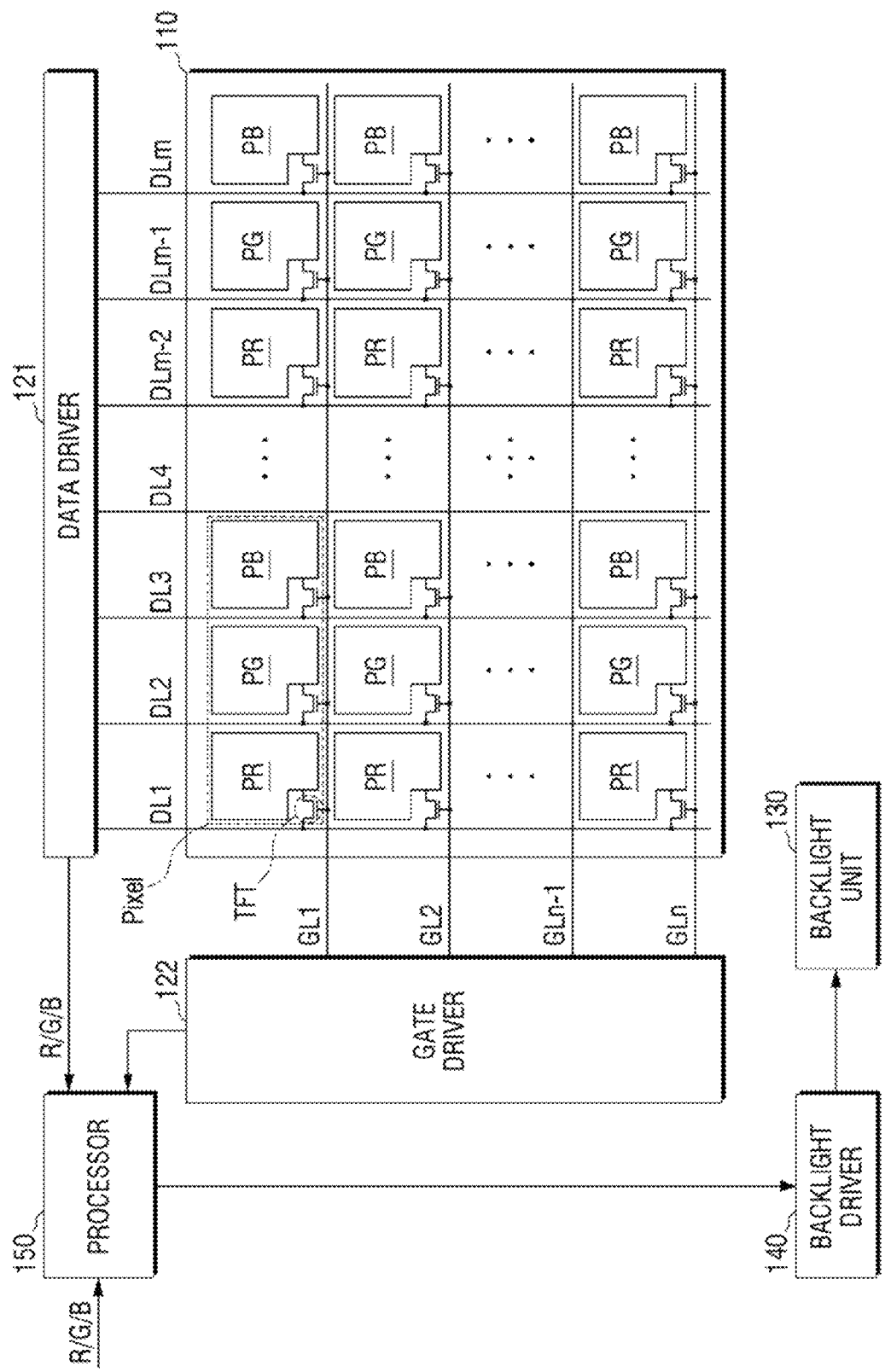

FIGS. 2A and 2B are views showing a configuration of an LCD device according to an embodiment of the present disclosure.

As shown in FIG. 2A, the LCD device 100 includes a display panel 110, a panel driver 120, a backlight unit 130, a backlight driver 140, and a processor 150.

The LCD device 100 may be an LCD device provided with local dimming technology as described above. That is, the LCD device 100 may individually drive the plurality of backlights based on a gray level of each pixel of an inputted frame.

Herein, the frame refers to a display duration of one screen displaying one completed image by applying data corresponding to one screen to all pixels, and the frame duration may be standardized as 1/60 second (60 Hz) in the case of the NTSC method, and may be standardized as 1/50 second (50 Hz) in the case of the PAL method.

The LCD device 100 may individually drive the plurality of backlights, and provide an image by adjusting a gray level of a pixel corresponding to each backlight.

In the display panel 110, the plurality of pixels may be configured to form one frame spatially, and each pixel may be formed of a plurality of sub-pixels. For example, each pixel may be formed of three sub-pixels corresponding to red, green, and blue.

The display panel 110 may control an amount of passing light of a light source emitted from the backlight unit 130 by controlling light transmissivity of each pixel. That is, the display panel 110 may provide an amount of light lower than the maximum amount of light provided by the backlight unit as an output.

The display panel 110 includes red, green, and blue filters for each pixel, and light passing through the pixel passes through the filters, thereby representing colors.

The panel driver 120 may drive each of the plurality of pixels under control of the processor 150, which will be described below.

In particular, the panel driver 120 may drive the plurality of pixels based on gray levels of the plurality of pixels which are changed by individually controlling the backlights.

The panel driver 120 may include a data driver 121 to supply video data to data lines, and a gate driver 122 to supply a scan pulse to gate lines. This will be described in detail with reference to the drawings.

The backlight unit 130 may be disposed under the display panel 110, and may include a plurality of backlights which divide the display panel 110 into a plurality of regions and emit light to the respective regions.

Each backlight may be implemented by using a light emitting diode-black light unit (LED-BLU), and the plurality of backlights may be individually controlled by the backlight driver 140. That is, the plurality of backlights may have the same maximum luminance, but may be driven with different luminance when being driven.

The backlight unit 130 emits light to the display panel 110 on the rear surface of the display panel 110, that is, the opposite surface of the surface on which an image is displayed.

The backlight driver 140 may flash on or off the light source of the backlight unit 130 under control of the processor 150. In particular, the backlight driver 140 may drive the plurality of backlights based on gray level information of the plurality of pixels corresponding to the plurality of regions of the display panel 110.

The processor 150 may calculate a first amount of light to be incident on each pixel based on a gray level of each pixel, may calculate a second amount of light incident on each pixel according to a driving state of the plurality of backlights, may change a gray level of at least one of the plurality of pixels based on a difference between the first amount of light and the second amount of light, and may control the panel driver 120 based on the changed gray level.

Herein, the first amount of light refers to an amount of light that should be incident on a pixel when one backlight is provided for one pixel. The second amount of light refers to an amount of incident light that is changed due to a gray level difference from adjacent pixels since one backlight is provided for a plurality of pixels. That is, the first amount of light refers to an ideal amount of light, and the second amount of light refers to a real amount of light.

The processor 150 may change the gray level of each pixel based on a difference between the first amount of light and the second amount of light. For example, the processor 150 may reduce the gray level of the pixel as the difference between the first amount of light and the second amount of light increases.

Alternatively, the processor 150 may change the gray level of each pixel based on the difference between the first amount of light and the second amount of light, and the gray level of each pixel. For example, when the difference between the first amount of light and the second amount of light is great, but the gray level value of the pixel is greater than or equal to a predetermined value, the processor 150 may not change the gray level of the pixel, and may change the gray level of the pixel only when the gray level value of the pixel is less than the predetermined value.

In particular, the processor 150 may reduce a gray level of a pixel the gray level of which is less than the predetermined value from among pixels in which the difference between the first amount of light and the second amount of light is greater than or equal to a predetermined threshold value. For example, when the difference between the first amount of light and the second amount of light is less than the predetermined threshold value, the processor 150 may not change the gray level of the pixel. This is because there is no big difference between the ideal amount of light and the real amount of light and thus a change is not required.

The processor 150 may calculate a changed gray level through the following Equation:

$$I'(x,y)=I(x,y)-\Delta$$

where I'(x,y) is a changed gray level of a pixel located at coordinates (x,y), I(x,y) is an original gray level of the pixel located at coordinates (x,y), and Δ is an amount of gray level adjustment determined based on a difference between the first amount of light and the second amount of light, and a gray level of each pixel.

In particular, the processor 150 may calculate the amount of gray level adjustment through the following Equation:

$$\Delta=\lambda(B(x,y))\times(I(x,y)-\delta(I(x,y)))$$

where B(x,y) is the second amount of light at the pixel located at coordinates (x,y), λ(B(x,y)) is a predetermined function regarding B(x,y), and δ(I(x,y)) is a predetermined function regarding I(x,y).

In addition, λ may be set to a different value in every light amount section when the range of light to be incident on each pixel by the backlight is divided into a predetermined number of light amount sections.

The processor 150 may group the plurality of pixels to include a predetermined number of adjacent pixels, and may calculate an amount of gray level adjustment for each region including the grouped pixels.

In addition, the processor 150 may control the backlight driver 140 to drive the plurality of backlights based on any one of the highest value of the gray levels of the plurality of pixels corresponding to each of the plurality of regions, and an average value of the gray levels of the plurality of pixels.

FIG. 2B is a view to illustrate a detailed configuration of the LCD device 100 illustrated in FIG. 2A.

The display panel 110 may have gate lines (GL1 to GLn) and data lines (DL1 to DLm) intersecting each other, and may have R, G, B subpixels (PR, PG, PB) formed in regions provided by the intersections. The adjacent R, B subpixels (PR, PG, PB) may form one pixel. That is, each pixel may include an R subpixel (PR) representing red (R), a G subpixel (PG) representing green (G), and a B subpixel (PB) representing blue (B), and may reproduce colors of a subject with three primary colors of red (R), green (G), and blue (B). Each subpixel (PR, PG, PB) may include a pixel electrode and a common electrode, and, as an arrangement of liquid crystals is changed by an electric filed formed by a potential difference between both electrodes, light transmissivity may change. TFTs formed at the intersections between the gate lines (GL1 to GLn) and the data lines (DL1 to DLm) may supply video data from the data lines (DL1 to DLm), that is, red (G), green (G), and blue (B) data, to the pixel electrodes of the subpixels (PR, PG, PB), in response to a scan pulse from the gate lines (GL1 to GLn).

The processor 150 may supply three colors data of red (R), green (G), and blue (B) supplied from a graphic card of a system to the data driver 121, while controlling the data driver 121, the gate driver 122, and the backlight driver 140.

The data driver 121 may convert the red (R), green (G), and blue (B) data supplied from the processor 150 as a digital signal, into an analogue data voltage, and may supply the analogue data voltage to the data lines (DL1 to DL2).

The data driver 121 may provide a data signal to the panel display 110 on a frame basis.

The gate driver 122 may supply a scan pulse for selecting a horizontal line to which data is to be supplied to the gate lines (GL1 to GLn) in sequence. Herein, the scan pulse may be provided alternately through an even-numbered line and an odd-numbered line.

In addition, although not shown in the drawings, the LCD device 100 may further include an inverter to apply an alternating current voltage and a current to the backlight unit 130, a reference gamma voltage generator to generate a reference gamma voltage and to supply the same to the data driver 121, and a voltage generator to supply a driving voltage for driving each device, and to supply a common voltage (Vcom) to the common electrode of the display panel 110.

Hereinafter, an embodiment of an operation for solving a leakage phenomenon will be described with reference to FIGS. 3 to 9.

Figure 3:
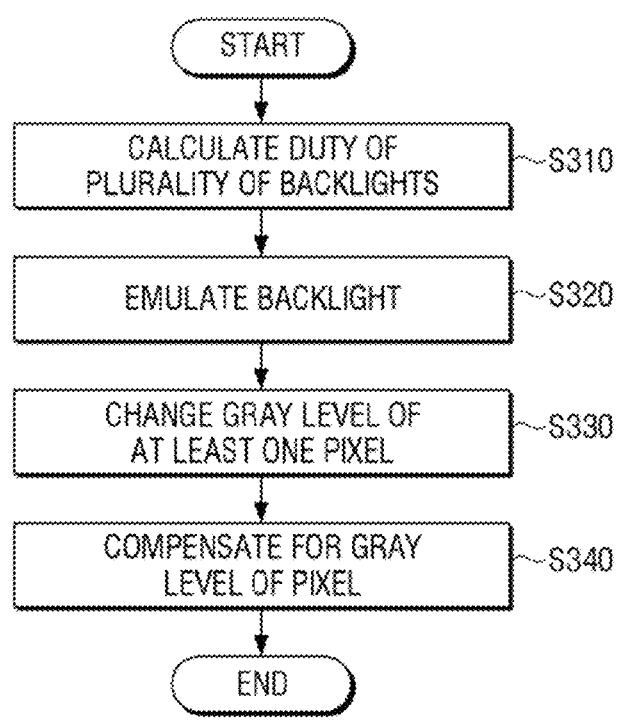
FIG. 3 is a flowchart to illustrate an operation of a processor according to an embodiment of the present disclosure.

FIG. 3 is a flowchart to illustrate an operation of the processor 150 according to an embodiment of the present disclosure.

Figure 4A:
FIGS. 4A to 4D are views illustrating a result of the operation of the processor.

First, the processor 150 may calculate a duty of the plurality of backlights based on an inputted image (S310). For example, in response to an image as shown in FIG. 4A being inputted, the processor 150 may calculate the duty of the plurality of backlights by analyzing the inputted image.

As described above, the backlight unit 130 may include the plurality of backlights. For example, the backlight unit 130 may include N×M backlights.

The processor 150 may divide the display panel 110 into N×M regions to match the N×M backlights. In addition, the processor 150 may determine luminance of each backlight based on gray level information of a plurality of pixels corresponding to each region. The processor 150 may control the backlight driver 140 to drive the plurality of backlights based on the determined luminance.

For example, the processor 150 may consider gray levels of a plurality of pixels corresponding to the first backlight located at the left upper end in order to drive the first backlight. In FIG. 4A, all pixels located at the left upper end are black, and, in consideration of this, the processor 150 may not drive the first backlight.

The processor 150 may consider gray levels of a plurality of pixels corresponding to the N×M-th backlight located at the right lower end in order to drive the N×M-th backlight. In FIG. 4A, most of the pixels located at the right lower end are bright color, and, in consideration of this, the processor 150 may drive the N×M-th backlight bright. In this way, the processor 150 may determine the luminance of the N×M backlights.

Figure 4B:
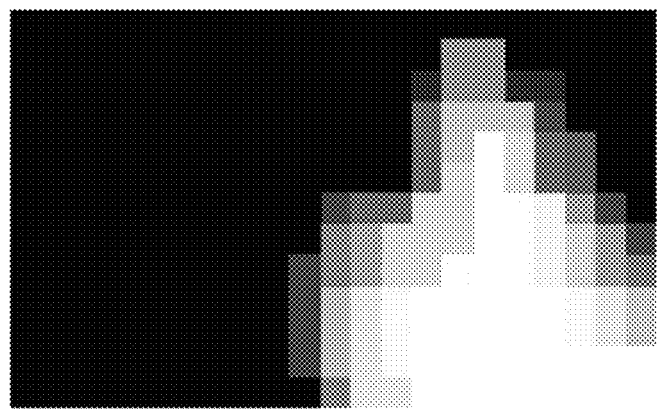

FIG. 4B shows luminance of the N×M backlights. As shown in FIG. 4B, the processor 150 may determine the luminance of the N×M backlights, and may control the backlight driver 140 based on the determined luminance.

However, in FIG. 4B, it is assumed that the display panel 110 is clearly divided into the plurality of regions, and there is no interference between backlights in respective regions. That is, in reality, light emitted from the backlight influences adjacent regions due to the light diffusion property.

Accordingly, in order to consider this point, the processor 150 may perform backlight emulation based on the duty of the plurality of backlights (S320). The processor 150 may calculate an estimate of an amount of light really incident on each pixel through backlight emulation.

Figure 4C:
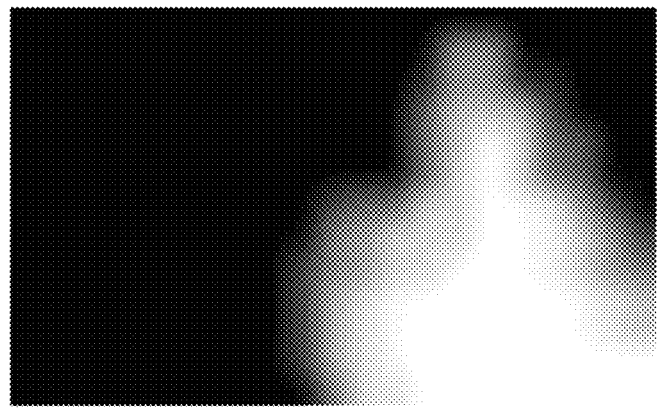

FIG. 4C illustrates an estimate of an amount of light really incident on each pixel through backlight emulation. FIG. 4B illustrates that luminance of the N×M regions is gradationally changed, and FIG. 4C illustrates that luminance of the N×M regions is gradually changed.

The result of the backlight emulation is merely to estimate an amount of light really incident on each pixel, and may have a slight error with respect to an amount of light incident on pixel by driving the backlight.

In addition, the processor 150 may change a gray level of at least one pixel based on the inputted image and the result of the backlight emulation (black level enhancement) (S330). In FIG. 4A, the left eye of the woman should be displayed in black, and is the same color as that of the background. However, according to FIG. 4C, it can be seen that a large amount of light is incident on the left eye portion of the woman. Accordingly, although the black of the background and the black of the left eye portion of the woman are the same color, they may be displayed in different colors when the image is displayed after the backlights are driven, and a leakage phenomenon occurs.

This problem arises when there is a great gray level difference between pixels belonging to the same region. Accordingly, the processor 150 may detect a pixel in which the above-described problem arises, and may reduce the gray level of the detected pixel. That is, even when the amount of incident light increases, the processor 150 may further reduce the amount of passing light by reducing the gray level of the detected pixel, and thus can solve the above-described problem. A method for the processor 150 to reduce the gray level will be described in detail.

The processor 150 may compensate for the gray level of the pixel based on the image and the result of the backlight emulation going through step 330 (pixel compensation) (S340). This is a compensation achieved by applying local dimming technology, and, since the backlight is not driven with maximum luminance, the gray level of the pixel is increased through this operation. This has been described with reference to Equation 2, and thus a detailed description is omitted.

Figure 4D:

FIG. 4D is a view representing the plurality of pixels based on the changed gray level. Compared with FIG. 4A, FIG. 4D represents black portions more clearly. That is, when the above-described method is used, the contrast ratio can be enhanced.

Figure 5:
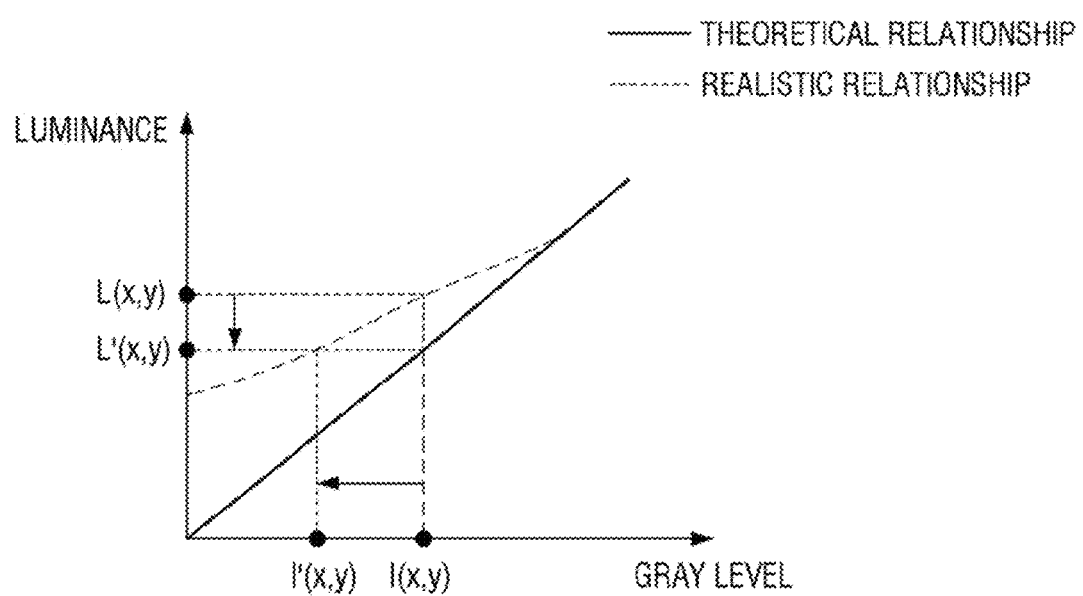
FIG. 5 is a view to illustrate a method for reducing a gray level according to an embodiment of the present disclosure.

FIG. 5 is a view to illustrate a method for reducing a gray level according to an embodiment of the present disclosure.

As shown in FIG. 5, the x-axis indicates a gray level and the y-axis indicates luminance of a pixel. Theoretically, when the gray level is reduced, the luminance of the pixel should be reduced in proportion to the gray level. However, in reality, when the gray level is reduced in a low gray level section, the luminance of the pixel may not be reduced in proportion to the reduced gray level.

For example, the gray level of the pixel located at coordinates (x,y) is I(x,y). In this case, the luminance of the pixel should be L'(x,y). However, the real luminance of the pixel is L(x,y). Accordingly, in order to change the luminance of the pixel to L'(x,y), the gray level of the pixel located at coordinates (x,y) may be changed to I'(x,y).

In order to change the gray level, the processor 150 may calculate a first amount of light to be incident on each pixel based on the gray level of each pixel, first. The first amount of light may be calculated by considering only the gray level of one pixel without influences of neighboring backlights and neighboring pixels. That is, the first amount of light indicates an amount of light that is incident on a pixel from the backlight based on the gray level of the pixel when only one pixel and one backlight are provided.

In addition, the processor 150 may calculate a second amount of light incident on each pixel according to a driving state of the plurality of backlights. This is the operation in step S320 of FIG. 3 and thus a detailed description is omitted.

The processor 150 may change the gray level of at least one of the plurality of pixels based on a difference between the first amount of light and the second amount of light. In particular, the processor 150 may select a pixel to change the gray level from among the plurality of pixels based on the difference between the first amount of light and the second amount of light, and may calculate how much the gray level of the selected pixel is changed.

In particular, the processor 150 may change the gray level of each pixel based on the difference between the first amount of light and the second amount of light. Alternatively, the processor 150 may change the gray level of each pixel based on the difference between the first amount of light and the second amount of light and the gray level of each pixel. Alternatively, the processor 150 may reduce the gray level of a pixel the gray level of which is less than or equal to a predetermined value from among the pixels in which the difference between the first amount of light and the second amount of light is greater than or equal to a predetermined threshold value.

For example, the processor 150 may not change the gray level of a pixel in which the difference between the first amount of light and the second amount of light is less than the predetermined threshold value. This may be the case where an error is not great and thus is difficult to recognize with human eyes.

Alternatively, the processor 150 may reduce only the gray level of the pixel the gray level of which is less than or equal to the predetermined value. As described above, there may be a problem that a pixel having a low gray level from among a plurality of pixels having a great gray level difference is represented bright due to neighboring pixels although the pixel should be represented darkly. This problem normally arises in the pixel having the low gray level.

Alternatively, the processor 150 may change the gray level of at least one pixel by considering not only the difference between the first amount of light and the second amount of light but also all of the gray levels of the pixels.

In this case, the processor 150 may calculate the changed gray level through the following Equation:

$$I'(x,y)=I(x,y)-\Delta \qquad \text{[Equation 3]}$$

where I'(x,y) is the changed gray level of the pixel located at coordinates (x,y), I(x,y) is an original gray level of the pixel located at coordinates (x,y), and Δ is an amount of gray level adjustment determined based on the difference between the first amount of light and the second amount of light, and the gray level of each pixel.

Herein, the processor 150 may calculate the amount of gray level adjustment through the following Equation:

$$\Delta=\lambda(B(x,y))\times(I(x,y)-\delta(I(x,y))) \qquad \text{[Equation 4]}$$

where B(x,y) is the second amount of light at the pixel located at coordinates (x,y), λ(B(x,y)) is a predetermined function regarding B(x,y), and δ(I(x,y)) is a predetermined function regarding I(x,y).

First, the δ function will be described with reference to FIG. 6.

Figure 6:
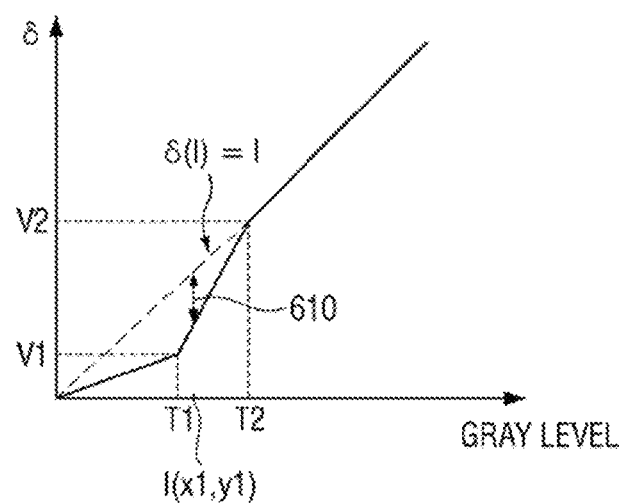
FIG. 6 is a view to illustrate gray level adjustment according to a gray level of a pixel according to an embodiment of the present disclosure.

FIG. 6 is a view to illustrate adjustment of a gray level according to a gray level of a pixel according to an embodiment of the present disclosure.

As shown in FIG. 6, the x-axis indicates a gray level and the y-axis indicates the δ function. δ(I(x,y)) indicates a predetermined function regarding I(x,y). In Equation 4, if λ is 1, the amount of gray level adjustment may be expressed as follows. λ will be described below with reference to FIG. 7.

$$\Delta=I(x,y)-\delta(I(x,y)) \qquad \text{[Equation 5]}$$

That is, the amount of gray level adjustment of the pixel located at coordinates (x,y) may be a difference between the gray level of the pixel located at coordinates (x,y) and a δ value regarding the pixel located at coordinates (x,y). For example, as shown in FIG. 6, the amount of gray level adjustment of a pixel located at coordinates (x1, y1) may be a difference 610 between the gray level of the pixel located at coordinates (x1, y1) and a δ value regarding the pixel located at coordinates (x1, y1). That is, the processor 150 may reduce the gray level of coordinates (x1, y1) by the calculated difference 610.

In a section higher than T2, δ(I(x,y)) equals I(x,y) (δ(I(x,y))=I(x,y)) and thus Δ equals 0 (Δ=0). That is, the processor 150 may not adjust the gray level of a pixel the gray level of which is higher than T2.

In FIG. 6, T1, T2, V1, and V2 are variables for explaining the shape of the graph, and are changeable. However, T1 and T2 are smaller than the maximum value of the gray level.

In FIG. 6, the gray level is divided into a section lower than T1, a section between T1 and T2, and a section higher than T2. However, this should not be considered as limiting. For example, the δ function may be implemented in a parabolic form which is downwardly curved during the section lower than T2. That is, the graph of the δ function may have only to be under the y=x function expressed by the dashed line in FIG. 6.

In addition, in FIG. 6, the gray level of the pixel the gray level of which is higher than T2 is not adjusted. However, this should not be considered as limiting. For example, the processor 150 may adjust a gray level when the gray level is great but there is an error.

Figure 7:
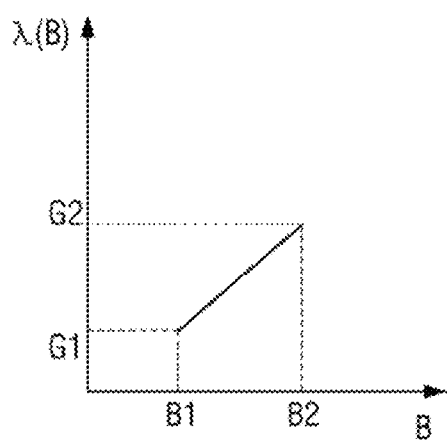
FIG. 7 is a view to illustrate a method for considering a degree of additional leakage according to an embodiment of the present disclosure.

FIG. 7 is a view to illustrate a method for considering a degree of additional leakage according to an embodiment of the present disclosure.

As shown in FIG. 7, the x-axis indicates the second amount of light at the pixel located at coordinates (x,y), and the y-axis indicates the λ function. λ(B(x,y)) indicates a predetermined function regarding B(x,y).

The λ function may be a function indicating a degree of additional leakage. In particular, the λ function may be adjusted to have a value ranging from 0 to 1.

B1 indicates minimum luminance of the backlight determined in consideration of saturation, and B2 indicates maximum luminance of the backlight. G1 and G2 are values corresponding to B1 and B2, and indicate a minimum value and a maximum value of a leakage occurring due to a hardware problem.

To explain the slope in FIG. 7, the luminance of the pixel located at coordinates (x,y) in an ideal case may be calculated as follows:

[Equation 6]
$$Lopt(x, y) = (B\max \times Rb, opt(x, y)) \times (I(x, y) \times Rc, opt(x, y) + \sigma)$$
$$= B\max \times I(x, y) + (B\max \times Rb, opt(x, y)) \times \sigma$$
$$(\text{if}, Rb, opt = 1/Rc, opt)$$

where Lopt(x,y) is ideal luminance of the pixel located at coordinates (x,y), Bmax is the maximum luminance of the backlight, I(x,y) is a gray level of the pixel located at coordinates (x,y), σ is a leakage ratio due to a physical limit of a liquid crystal, Rb,opt(x,y) is an ideal backlight dimming ratio of the pixel located at coordinates (x,y) and has a value ranging from 0 to 1, and Rc,opt(x,y) is an ideal compensation ratio of the pixel located at coordinates (x,y) and has a value greater than 1.

Herein, the processor 150 may calculate Rb,opt(x,y) on the assumption that there is no leakage caused by influences of neighboring pixels and neighboring backlights. The other values are similar to those in Equation 2 and thus a detailed description thereof is omitted.

Equation 2 shows the luminance of a pixel in consideration of a real leakage. Accordingly, it may be determined how much the leakage increases by comparing L(x,y) and Lopt(x,y), as follows:

[Equation 7]
$$L(x, y) - Lopt(x, y) = (B\max \times I(x, y) + (B\max \times Rb(x, y)) \times \sigma) -$$
$$= B\max \times I(x, y) + (B\max \times Rb, opt(x, y)) \times \sigma$$
$$= (B\max \times Rb(x, y) - B\max \times Rb, opt(x, y)) \times \sigma$$

where Bmax×Rb(x,y) is real luminance of the backlight, and Bmax×Rb,opt(x,y) is ideal luminance of the backlight. In addition, Bmax×Rb(x,y) is a value at a point between B1 and B2, and Bmax×Rb,opt(x,y) may be B1. Accordingly, the slope in FIG. 7 is σ. That is, as Bmax×Rb(x,y) is closer to B1, the additional leakage may be minimized.

The λ function may be a function indicating a degree of additional leakage, and may be used as an index for determining a pixel having a great additional leakage. According to Equation 4, when there is no additional leakage, the λ function may be 0, and the processor 150 may multiply the amount of gray level adjustment with the λ function and may not adjust the gray level. That is, even when the amount of gray level adjustment is great, the processor 150 may consider that there may be no leakage by using the λ function.

Alternatively, when the additional leakage is great, the λ function may be 1, and the processor 150 may multiply the amount of gray level adjustment with the λ function and may adjust the gray level. That is, when the additional leakage is great, the processor 150 may adjust the gray level by considering only the amount of gray level adjustment.

FIGS. 8A and 8B are views to illustrate an example of a method for reducing an amount of operation.

As shown in FIG. 8A, the λ function may be calculated for each gray level. For example, when the gray level is defined as ranging from 0 to L−1, the λ function may vary according to the gray level, and L λ functions in total may be defined. Accordingly, when the method of FIG. 8A is performed, the amount of operation increases in comparison to the method of FIG. 8B.

FIG. 8B illustrates a method for reducing the λ function. As shown in FIG. 8B, all gray levels may be divided into a predetermined number of sections, and the λ function may be defined for each section. For example, when three gray levels are defined as one section, the total number of λ functions may be reduced by ⅓. Accordingly, the amount of operation may be reduced.

Although FIG. 8B illustrates the three gray levels are defined as one section, a different number of gray levels may be defined as one section.

The method for reducing the amount of operation based on the gray level has been described, but this should not be considered as limiting. For example, when a range of an amount of light that can be incident on each pixel from the backlight is divided into a predetermined number of light amount sections, the λ function may be set to a different value for each light amount section.

Figure 9:
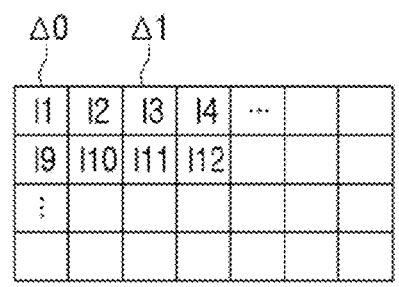
FIG. 9 is a view to illustrate a method for calculating an amount of gray level adjustment according to an embodiment of the present disclosure.

FIG. 9 is a view to illustrate a method for calculating an amount of gray level adjustment according to an embodiment of the present disclosure.

As shown in FIG. 9, the processor 150 may group the plurality of pixels to include a predetermined number of adjacent pixels, and may calculate Δ for each region including the grouped pixels.

For example, the processor 150 may group four pixels to one group, and may calculate Δ. As described in Equation 5, the processor 150 may calculate the amount of gray level adjustment Δ based on the gray level of the pixel. In this case, the processor 150 may calculate Δ based on any one of a highest value of the gray levels of the grouped pixels and an average value. Accordingly, the amount of operation can be reduced.

Figure 10:
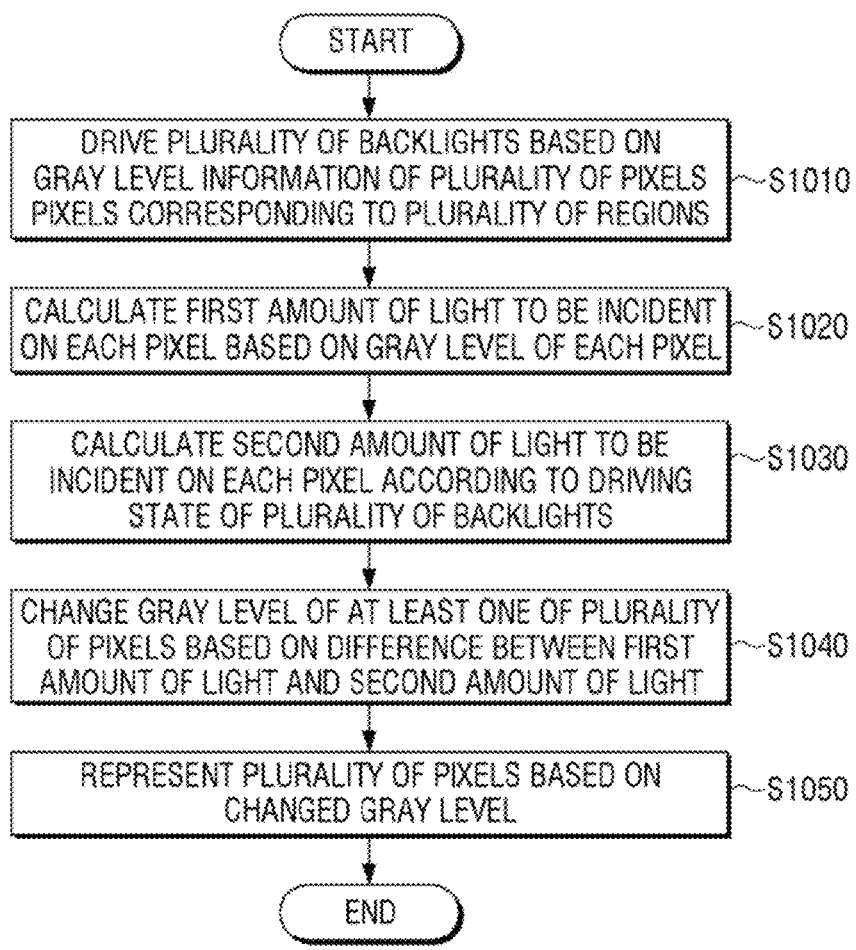
FIG. 10 is a flowchart to illustrate a driving method of an LCD device according to an embodiment of the present disclosure.

FIG. 10 is a flowchart to illustrate a driving method of an LCD device according to an embodiment of the present disclosure.

First, the LCD device drives a plurality of backlights based on gray level information of a plurality of pixels corresponding to a plurality of regions (S1010). The LCD device calculates a first amount of light to be incident on each pixel based on the gray level of each pixel (S1020). In addition, the LCD device calculates a second amount of light incident on each pixel according to a driving state of the plurality of backlights (S1030). In addition, the LCD device changes a gray level of at least one of the plurality of pixels based on a difference between the first amount of light and the second amount of light (S1040). In addition, the LCD device represents the plurality of pixels based on the changed gray level (S1050).

In addition, the changing (S1040) may include changing the gray level of each pixel based on the difference between the first amount of light and the second amount of light.

In addition, the changing (S1040) may include changing the gray level of each pixel based on the difference between the first amount of light and the second amount of light, and the gray level of each pixel.

In addition, the changing (S1040) may include reducing a gray level of a pixel the gray level of which is less than or equal to a predetermined value from among pixels in which the difference between the first amount of light and the second amount of light is greater than or equal to a predetermined threshold value.

In addition, the changing (S1040) may include changing the gray level of each pixel through the following equation:

$$I'(x,y)=I(x,y)-\Delta$$

where I'(x,y) is a changed gray level of a pixel located at coordinates (x,y), I(x,y) is an original gray level of the pixel located at coordinates (x,y), and Δ is an amount of gray level adjustment determined based on the difference between the first amount of light and the second amount of light, and the gray level of each pixel.

In addition, the changing (S1040) may include changing the gray level of each pixel through the following equation:

$$\Delta=\lambda(B(x,y))\times(I(x,y)-\delta(I(x,y)))$$

where B(x,y) is the second amount of light at the pixel located at coordinates (x,y), λ(B(x,y)) is a predetermined function regarding B(x,y), and δ(I(x,y)) is a predetermined function regarding I(x,y).

In addition, the λ function may be set to a different value in every light amount section when a range of an amount of light to be incident on each pixel by the backlight is divided into a predetermined number of light amount sections.

In addition, the changing (S1040) may include grouping the plurality of pixels to include a predetermined number of adjacent pixels, and calculating Δ for each region including the grouped pixels.

In addition, the driving (S1010) may include driving the plurality of backlights based on any one of a highest value of the gray levels of the plurality of pixels corresponding to the plurality of regions, and an average value of the gray levels of the plurality of pixels.

According to various embodiments of the present disclosure as described above, even when there is a great gray level difference among adjacent pixels, the LCD device may represent a pixel having a low gray level darkly.

In the above-described embodiments, the processor changes the gray level of at least one pixel based on the amount of light incident on the pixel. However, this should not be considered as limiting. For example, the processor may change the gray level of at least one pixel based on the amount of passing light of the pixel.

The driving method of the local dimming LCD device including the plurality of backlights to emit light to each of a plurality of regions according to various exemplary embodiments of the present disclosure described above may be implemented as a program code executable in a computer, and may be stored in various non-transitory computer readable media, and may be provided to each server or devices to be executed by a processor.

For example, there is provided a non-transitory computer readable medium which stores a program sequentially performing the steps of: driving the plurality of backlights based on gray level information of a plurality of pixels corresponding to the plurality of regions; calculating a first amount of light to be incident on each pixel based on the gray level of each pixel; calculating a second amount of light incident on each pixel according to a driving state of the plurality of backlights; changing a gray level of at least one of the plurality of pixels based on a difference between the first amount of light and the second amount of light; and representing the plurality of pixels based on the changed gray level.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

While preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:
1. A local dimming LCD device comprising:
a display panel comprising a plurality of pixels;
a panel driver configured to drive each of the plurality of pixels;
a plurality of backlights, the plurality of backlights respectively corresponding to a plurality of regions of the display panel and being configured to respectively emit light to each of the plurality of regions;

a backlight driver configured to drive the plurality of backlights based on gray level information of the plurality of pixels corresponding to the plurality of regions; and a processor configured to calculate a first amount of light to be incident on each pixel based on the gray level of each pixel, to calculate a second amount of light incident on each pixel according to a driving state of the plurality of backlights, to change a gray level of at least one of the plurality of pixels based on a difference between the first amount of light and the second amount of light, and to control the panel driver based on the changed gray level.

2. The LCD device of claim 1, wherein the processor is configured to change the gray level of each pixel based on the difference between the first amount of light and the second amount of light.

3. The LCD device of claim 1, wherein the processor is configured to change the gray level of each pixel based on the difference between the first amount of light and the second amount of light, and the gray level of each pixel.

4. The LCD device of claim 3, wherein the processor is configured to reduce a gray level of a pixel the gray level of which is less than or equal to a predetermined value from among pixels in which the difference between the first amount of light and the second amount of light is greater than or equal to a predetermined threshold value.

5. The LCD device of claim 1, wherein the processor is configured to calculate the changed gray level through the following equation:

$$I'(x,y)=I(x,y)-\Delta$$

where I'(x,y) is a changed gray level of a pixel located at coordinates (x,y), I(x,y) is an original gray level of the pixel located at coordinates (x,y), and $\Delta$ is an amount of gray level adjustment determined based on the difference between the first amount of light and the second amount of light, and the gray level of each pixel.

6. The LCD device of claim 5, wherein the processor is configured to calculate the amount of gray level adjustment through the following equation:

$$\Delta=\lambda(B(x,y))\times(I(x,y)-\delta(I(x,y)))$$

where B(x,y) is the second amount of light at the pixel located at coordinates (x,y), $\lambda(B(x,y))$ is a predetermined function regarding B(x,y), and $\delta(I(x,y))$ is a predetermined function regarding I(x,y).

7. The LCD device of claim 6, wherein the $\lambda$ function is set to a different value in every light amount section when a range of an amount of light to be incident on each pixel by a corresponding backlight is divided into a predetermined number of light amount sections.

8. The LCD device of claim 5, wherein the processor is configured to group the plurality of pixels to include a predetermined number of adjacent pixels, and to calculate $\Delta$ for each region including the grouped pixels.

9. The LCD device of claim 1, wherein the processor is configured to control the backlight driver to drive the plurality of backlights based on any one of a highest value of gray levels of the plurality of pixels corresponding to the plurality of regions, and an average value of the gray levels of the plurality of pixels.

10. A driving method of a local dimming LCD device comprising a plurality of backlights configured to respectively emit light to a plurality of regions of a display panel, the method comprising:

driving the plurality of backlights based on gray level information of a plurality of pixels corresponding to the plurality of regions;

calculating a first amount of light to be incident on each pixel based on the gray level of each pixel;

calculating a second amount of light incident on each pixel according to a driving state of the plurality of backlights;

changing a gray level of at least one of the plurality of pixels based on a difference between the first amount of light and the second amount of light; and representing the plurality of pixels based on the changed gray level.

11. The driving method of claim 10, wherein the changing comprises changing the gray level of each pixel based on the difference between the first amount of light and the second amount of light.

12. The driving method of claim 10, wherein the changing comprises changing the gray level of each pixel based on the difference between the first amount of light and the second amount of light, and the gray level of each pixel.

13. The driving method of claim 12, wherein the changing comprises reducing a gray level of a pixel the gray level of which is less than or equal to a predetermined value from among pixels in which the difference between the first amount of light and the second amount of light is greater than or equal to a predetermined threshold value.

14. The driving method of claim 10, wherein the changing comprises changing the gray level of each pixel through the following equation:

$$I'(x,y)=I(x,y)-\Delta$$

where I'(x,y) is a changed gray level of a pixel located at coordinates (x,y), I(x,y) is an original gray level of the pixel located at coordinates (x,y), and $\Delta$ is an amount of gray level adjustment determined based on the difference between the first amount of light and the second amount of light, and the gray level of each pixel.

15. The driving method of claim 14, wherein the changing comprises changing the gray level of each pixel through the following equation:

$$\Delta=\lambda(B(x,y))\times(I(x,y)-\delta(I(x,y)))$$

where B(x,y) is the second amount of light at the pixel located at coordinates (x,y), $\lambda(B(x,y))$ is a predetermined function regarding B(x,y), and $\delta(I(x,y))$ is a predetermined function regarding I(x,y).

16. The LCD device of claim 1, wherein the processor is configured to receive image data and calculate the first amount of light based on the image data.

17. The LCD device of claim 16, wherein the processor is configured to calculate the second amount of light based on the image data.

18. The LCD device of claim 16, wherein the processor is configured to calculate the second amount of light by identifying the driving state of the plurality of backlights based on the gray level information of the plurality of pixels corresponding to the plurality of regions indicated by the image data.

19. The LCD device of claim 16, wherein the processor is configured to calculate the second amount of light based on the image data of at least two of the plurality of pixels.

20. A non-transitory computer readable medium storing a program, which when executed by a processor of a local dimming LCD device that includes a plurality of backlights configured to respectively emit light to a plurality of regions of a display panel, performs:
- driving the plurality of backlights based on gray level information of a plurality of pixels corresponding to the plurality of regions;
- calculating a first amount of light to be incident on each pixel based on the gray level of each pixel;
- calculating a second amount of light incident on each pixel according to a driving state of the plurality of backlights;
- changing a gray level of at least one of the plurality of pixels based on a difference between the first amount of light and the second amount of light; and
- representing the plurality of pixels based on the changed gray level.

* * * * *